US010468161B2

(12) United States Patent
Kominato et al.

(10) Patent No.: US 10,468,161 B2
(45) Date of Patent: Nov. 5, 2019

(54) WIRING MEMBER, MANUFACTURING METHOD OF WIRING MEMBER, AND WIRING MEMBER CONNECTION STRUCTURE

(71) Applicant: Yazaki Corporation, Minato-ku, Tokyo (JP)

(72) Inventors: Yasuhiro Kominato, Susono (JP); Shingo Kato, Susono (JP); Shigeki Iimuro, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/840,190

(22) Filed: Dec. 13, 2017

(65) Prior Publication Data

US 2018/0174716 A1 Jun. 21, 2018

(30) Foreign Application Priority Data

Dec. 16, 2016 (JP) ................................ 2016-244781
Apr. 25, 2017 (JP) ................................ 2017-086562

(51) Int. Cl.
*B21D 7/14* (2006.01)
*H01B 7/08* (2006.01)
(Continued)

(52) U.S. Cl.
CPC ..... *H01B 13/01254* (2013.01); *B21C 37/155* (2013.01); *B21D 7/14* (2013.01); *B60R 16/0215* (2013.01); *H01B 7/08* (2013.01); *H01R 11/288* (2013.01); *B21D 7/022* (2013.01); *H01B 7/0009* (2013.01); *H01B 7/0823* (2013.01); *H01R 11/12* (2013.01)

(58) Field of Classification Search
CPC .. H01B 13/01254; H01B 7/08; H01B 7/0009; H01B 7/0823; B21C 37/155; B21D 7/14; B21D 7/022; B60R 16/0215; H01R 11/288; H01R 11/12
USPC ........................................................ 174/72 R
See application file for complete search history.

(56) References Cited

U.S. PATENT DOCUMENTS 2,912,603 A * 11/1959 Farnsworth .............. H02G 5/06 174/88 B
2,912,668 A * 11/1959 Eddy ...................... H01R 13/33 439/668

(Continued)

FOREIGN PATENT DOCUMENTS

CN 201364748 Y 12/2009
CN 101982903 A 3/2011

(Continued)

OTHER PUBLICATIONS

May 10, 2019—(CN) The First Office Action—App 201711353612.9, Eng Tran.

*Primary Examiner* — Andargie M Aychillhum
*Assistant Examiner* — Michael F McAllister
(74) *Attorney, Agent, or Firm* — Banner & Witcoff, Ltd.

(57) ABSTRACT

A wiring member includes a laminated flat conductor and an insulating layer provided around the laminated flat conductor. The laminated flat conductor includes a plurality of flat conductors laid on each other in a thickness direction of the laminated flat conductor, and insulating sheet members each of which is interposed between and electrically insulates adjacent ones of the plurality of flat conductors.

9 Claims, 18 Drawing Sheets

100 17 19 17 17 17 II 15 II 17 19 17 17 17 11A 11B 11C 11D

(51) Int. Cl.

| | |
|---|---|
| ***B21D 7/022*** | (2006.01) |
| ***H01R 11/12*** | (2006.01) |
| ***H01B 13/012*** | (2006.01) |
| ***B21C 37/15*** | (2006.01) |
| ***H01R 11/28*** | (2006.01) |
| ***B60R 16/02*** | (2006.01) |
| *H01B 7/00* | (2006.01) |

(56) References Cited

U.S. PATENT DOCUMENTS 3,104,276 A * 9/1963 Cataldo .................. H02G 5/007 174/88 B
3,264,403 A * 8/1966 Erdle ..................... H02G 5/005 174/117 FF
3,346,687 A * 10/1967 Giger, Jr. ................. H02G 5/06 174/68.2
3,476,871 A * 11/1969 Erdle ..................... H02G 5/005 174/117 FF
4,009,920 A * 3/1977 Hicks, Jr. ............... H02G 5/007 439/213
4,382,156 A * 5/1983 Jodoin ................... H02G 5/005 174/72 B
4,886,940 A * 12/1989 Gagnon ............... H01R 25/162 174/88 B
5,009,612 A * 4/1991 Rishworth ........... H01R 12/616 439/403
5,620,338 A * 4/1997 Stephens .............. H01R 11/281 439/522
5,915,998 A * 6/1999 Stidham ................... H01R 4/36 439/521
6,203,343 B1 * 3/2001 Chevassus-More ......................... B60R 16/0207 174/72 B
6,344,613 B1 * 2/2002 Kolodziej ........... B60R 16/0207 174/254
6,674,006 B1 * 1/2004 Linehan ............... H01R 31/085 174/149 B
7,595,445 B2 * 9/2009 Legendre ............. H01R 25/162 174/27
7,704,104 B2 * 4/2010 Duley .................... H01R 11/12 439/756
8,436,244 B2 * 5/2013 Takahashi ............. H02M 7/003 174/68.2
9,006,939 B2 4/2015 Toyama et al.
9,130,095 B2 * 9/2015 Kim .................... H01L 31/0504
9,419,321 B2 * 8/2016 Vaccaro .................... H01P 3/06
9,818,506 B2 * 11/2017 Andrews ................ H01B 13/06
9,902,346 B2 2/2018 Kugimiya et al.
2001/0010985 A1 * 8/2001 Kasai ................... H01R 9/2458 439/638
2003/0096520 A1 * 5/2003 Wolford ............... H01R 12/585 439/110
2007/0283997 A1 * 12/2007 Hachtmann ....... H01L 31/03928 136/244
2010/0212934 A1 * 8/2010 Sexton ................. H01B 7/0216 174/113 R
2011/0133548 A1 6/2011 Toyama et al.
2016/0152197 A1 6/2016 Kugimiya et al.
2018/0219362 A1 * 8/2018 Zamora Gil .............. F16B 2/22

FOREIGN PATENT DOCUMENTS

| | | | |
|---|---|---|---|
| CN | 102088171 | A | 6/2011 |
| CN | 202797317 | U | 3/2013 |
| CN | 203038681 | U | 7/2013 |
| CN | 105655824 | A | 6/2016 |
| JP | S58-142708 | A | 8/1983 |
| JP | 2000-268649 | A | 9/2000 |

* cited by examiner 43
43
47
43
49
48
43
51
53
55
57
59
63
61
15
63
15
300
15

43
43
47
43
65
43
67
69
63
71
15
63
15
300
15

551
11D
11C
11B
11A
19
400
123
450B
17
17
17
17
15
19
420
421
420
533
513
531
541
555
543
535
537
539
541
539
537
535
523C
523B
523A
523D
535
537
539
541
541
539
537
535
543
529
525
527
549

500
11D
11C
15
11B
400
11A
123
450B
519
420
541
19
421
549
551
543
17
515
511
521
523A
517
555
523D
523B
523C

WIRING MEMBER, MANUFACTURING METHOD OF WIRING MEMBER, AND WIRING MEMBER CONNECTION STRUCTURE

CROSS REFERENCE TO RELATED APPLICATIONS

This application is based on Japanese Patent Application (No. 2016-244781) filed on Dec. 16, 2016 and Japanese Patent Application (No. 2017-086562) filed on Apr. 25, 2017, the contents of which are incorporated herein by reference.

BACKGROUND OF THE INVENTION

1. Field of the Invention

The present invention relates to a wiring member, a manufacturing method of a wiring member, and a wiring member connection structure.

2. Description of the Related Art

For example, vehicles with a rear battery require a long battery cable for transmitting electricity from the rear side to the front side. In general, circular or flat thick wires for automobiles are used as those battery cables. In many wire manufacturing methods of such thick wires, a conductor as a wiring member obtained by twisting copper element wires together is covered with an insulating covering (e.g., made of polyvinyl chloride) by extrusion molding. In the extrusion molding, heat-molten insulating material is extruded out of a die together with a linear conductor, whereby the outer circumferential surface of the conductor is covered with the insulating material. Thus, covering the conductor with an insulating covering by extrusion molding requires that the conductor be a soft member obtained by twisting or not be bent if it is a hard member.

Among known manufacturing methods of an insulated conductor are a manufacturing method of an electric conductor (disclosed in JP-A-58-142708) which is a thin plate having insulative ceramic inclusions and a manufacturing method of an oxide superconducting wire (disclosed in JP-A-2000-268649).

Incidentally, in routing of a wiring member such as a battery cable in a vehicle compartment, to meet a need of enlargement of the vehicle compartment space, it is necessary to route the wiring member along a body panel and to reduce the thickness of the wiring member. To route a wiring member along a body panel, the wiring member needs to be bent so as to conform to the shape of the body panel.

However, it is difficult to bend a thick wire so that it conforms to the shape of a body panel. Furthermore, it is difficult to cover a hard conductor such as a busbar that has been bent so as to be able to extend along a body panel, with an insulating covering by extrusion molding. It is therefore desired to provide a wiring member in which a thin, bent conductor capable of being routed along a body panel is covered with a molded insulating covering.

SUMMARY OF THE INVENTION

The present invention has been made in view of the above circumstances, and an object of the present invention is therefore to provide a wiring member that is lighter and thinner than conventional wires and can thus reduce a routing space, a manufacturing method of such a wiring member, and a connection structure for such a wiring member(s).

The above object of the invention is attained by the following configurations, structures, and manufacturing methods.

(1) A wiring member including: a laminated flat conductor and an insulating layer provided around the laminated flat conductor, wherein the laminated flat conductor includes a plurality of flat conductors laid on each other in a thickness direction of the laminated flat conductor; and insulating sheet members each of which is interposed between and electrically insulates adjacent ones of the plurality of flat conductors.

According to the wiring member of item (1), since the plurality of flat conductors are laid on each other in the thickness direction of the laminated flat conductor with the insulating sheet members interposed between them, wiring members of plural circuits can be formed while the height is made smaller than in conventional thick wires. Since the plurality of flat conductors are not arranged in the direction that is perpendicular to the thickness direction of the laminated flat conductor, the routing space can be prevented from increasing in the width direction of the wiring member.

(2) The wiring member according to item (1), further including a shield layer which surrounds the plurality of flat conductors.

The wiring member of item (2) can suppress noise emission and avoid influence of external noise.

(3) A manufacturing method of a wiring member including an insulation step of inserting an insulating sheet member between adjacent ones of plurality of flat conductors to insulate the plurality of flat conductors electrically from each other; a lamination step of laminating the plurality of flat conductors in a thickness direction of a laminated flat conductor to form the laminated flat conductor; and an insulating layer forming step of forming an insulating layer around the laminated flat conductor.

According to the manufacturing method of a wiring member of item (3), since an insulating sheet member is interposed between adjacent ones of the flat conductors to insulate them electrically from each other when the plurality of flat conductors are laid on each other in the thickness direction, the flat conductors can be insulated from each other easily and reliably.

(4) The manufacturing method according to item (3), further including a bending step of bending the laminated flat conductor into a prescribed shape before forming the insulating layer.

According to the manufacturing method of item (4), the plural laminated flat conductors are bent in advance into such a shape as to extend along a body panel or the like. That is, the plurality of flat conductors that have been laid on each other with the flexible insulating sheets interposed between them can be bent together into such a shape as to extend along the body panel or the like. The outer surfaces of the plurality of flat conductors that have been bent are covered with the insulating layer.

In general, the surface of the body panel such as a floor panel along which the wiring member is to extend is undulated in a complicated manner because of the presence of cross members, reinforcement ribs, etc. Where a thick wire is routed so as to extend along such a body panel, the thick wire is located on convex portions. Thus, the interval between the body panel and, for example, an interior member disposed over it needs to be longer than at least the height of the thick wire. Furthermore, since it is difficult to bend the thick wire so that it conforms to convex portions, even in concave portions, the position of the interior member in the height direction cannot be set low in a desired manner being restricted by the position of the thick wire.

In contrast, according to this manufacturing method, the wiring member can be bent easily into such a shape as to extend along complicated convex and concave surfaces of a body panel or the like because the plurality of flat conductors that have been laid on each other with the insulating sheet members interposed between them are subjected to bending. As a result, the position of an interior member in the height direction can be set low in a desired manner in convex portions without suffering the restrictions that are imposed on thick wires that are difficult to bend.

Furthermore, the insulating layer is formed by, for example, powder coating on the surfaces of the wiring member in which the plurality of flat conductors have been laid on each other with the insulating sheet members interposed between them and then subjected to bending. By the powder coating, the insulating layer can be formed at a thickness of, for example, 0.1 to 0.2 mm in contrast to 1 to 2 mm that occurs in the case of conventional extrusion molding.

As such, the wiring members manufactured according to this manufacturing method can reduce the routing space, for example, the interval between a body panel and an interior member.

(5) The manufacturing method according to item (3) or (4), further including a shield layer forming step of forming a shield layer around the plurality of flat conductors.

According to the manufacturing method of item (5), after the insulating layer is formed around the plurality of flat conductors, the shield layer is formed by covering the outer surfaces of the insulating layer with a conductive braid, foil, or the like. If necessary, another insulating layer is formed outside the shield layer. In this manner, a wiring member having a shield function can be manufactured easily using the same equipment.

(6) A wiring member connection structure including spacers that are interposed between two sets of connection portions, to be connected electrically to each other, of two sets of flat conductors of two wiring members according to item (1) or (2) and serve to absorb gaps that are produced due to installation height differences between the two sets of connection portions.

According to the wiring member connection structure of item (6), even in a case that there exists a height difference between installation locations of the two wiring members to be connected to each other, since the spacers are interposed between the two sets of connection portions of the two sets of flat conductors, the spacers can absorb gaps that are produced due to height differences between the two sets of connection portions and thereby secure necessary contact areas, that is, high reliability of connections.

(7) A wiring member connection structure including bent portions that are provided in at least one of two sets of connection portions, to be connected electrically to each other, of two sets of flat conductors of two wiring members according to item (1) or (2) and serve to absorb gaps that are produced due to installation height differences between the two sets of flat conductors.

According to the wiring member connection structure of item (7), even in a case that there exists a height difference between installation locations of the two wiring members to be connected to each other, since at least one of the two sets of connection portions of the two sets of flat conductors is formed with the bent portions, the bent portions can absorb gaps that are produced due to height differences between the two sets of connection portions and thereby secure necessary contact areas, that is, high reliability of connections.

(8) A wiring member connection structure including spacers that are interposed between the connection portions of the flat conductors of the wiring member according to item (1) or (2) and connection pieces of a branching connection member to be connected electrically to the respective connection portions and serve to absorb gaps that are produced due to an installation height difference between the wiring member and the branching connection member.

According to the wiring member connection structure of item (8), even in a case that there exists a height difference between installation locations of the wiring member and the branching connection member, since the spacers are interposed between the connection portions and the connection pieces, the spacers can absorb gaps that are produced due to a height difference between the two members and thereby secure necessary contact areas, that is, high reliability of connections.

(9) A wiring member connection structure including bent portions that are provided in at least one of the set of connection portions of the flat conductors of the wiring member according to item (1) or (2) and a set of connection pieces of a branching connection member to be connected electrically to the respective connection portions and serve to absorb gaps that are produced due to an installation height difference between the wiring member and the branching connection member.

According to the wiring member connection structure of item (9), even in a case that there exists a height difference between installation locations of the wiring member and the branching connection member, since at least one of the set of connection portions and the set of connection pieces is formed with the bent portions, the bent portions can absorb gaps that are produced due to a height difference between the two members and thereby secure necessary contact areas, that is, high reliability of connections.

(10) The wiring member connection structure according to item (8) or (9), characterized in that the branching connection member is housed in an insulative branching box.

The wiring member according to the invention can be made lighter and thinner than conventional wires and can thus reduce a routing space.

The manufacturing method of a wiring member according to the invention makes it possible to form an insulating layer on a wiring member that is thinner than conventional coated wires formed by extrusion molding and has been bent so as to extend along a body panel or the like.

The wiring member connection structure according to the invention makes it possible to secure necessary contact areas by absorbing gaps that are produced due to a height difference between the two members and thereby secure high reliability of connections.

The invention has been described above concisely. The details of the invention will become more apparent when the modes for carrying out the invention (hereinafter referred to as embodiments) described below are read through with reference to the accompanying drawings.

DETAILED DESCRIPTION OF THE EXEMPLARY EMBODIMENTS

Embodiments of the present invention will be hereinafter described with reference to the drawings.

Figure 1:
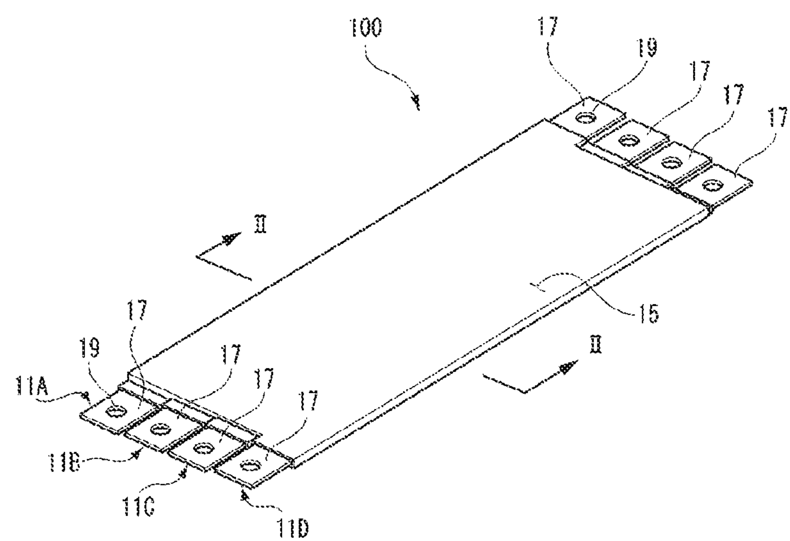
FIG. 1 is an overall perspective view of a wiring member according to a first embodiment of the present invention.
Figure 2:
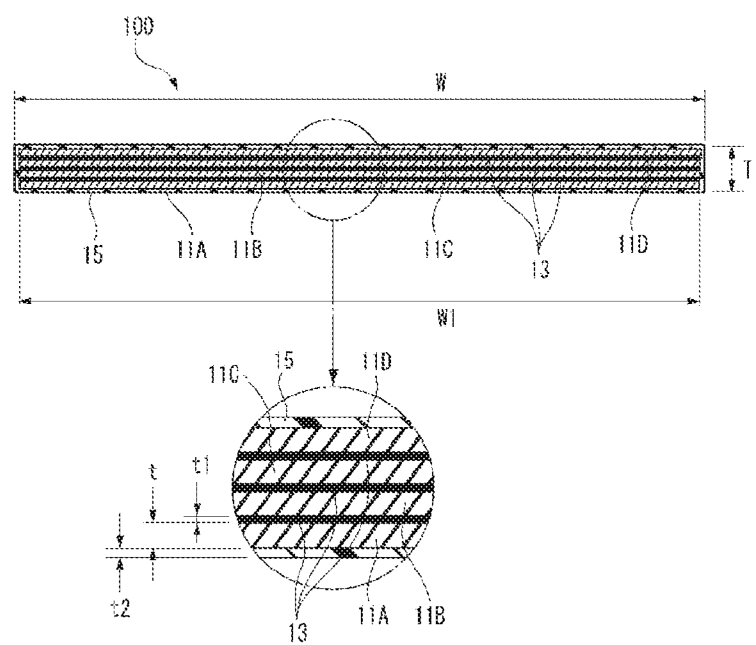
FIG. 2 is a sectional view, taken along arrowed line II-II in FIG. 1, of the vehicular wiring member.

FIG. 1 is an overall perspective view of a vehicular wiring member 100 according to a first embodiment of the invention. FIG. 2 is a sectional view, taken along arrowed line II-II in FIG. 1, of the vehicular wiring member 100.

The vehicular wiring member 100 according to the first embodiment of the invention is a wiring member including plurality of flat conductors 11A-11D (see FIG. 2), insulating sheet members 13, and an insulating layer 15.

The plural flat conductors 11A-11D employed in the first embodiment are laid on each other in the thickness direction and may be made of a conductive material such as a copper alloy or an aluminum alloy. This embodiment is directed to a case that they are flat conductors made of an aluminum alloy.

Each insulating sheet member 13 is interposed between adjacent ones of the flat conductors 11A-11D and electrically insulates them from each other. The insulating sheet members 13 may be a resin sheet member made of flexible PET (polyethylene terephthalate) or PEN (polyethylene naphthalate). The insulating sheet members 13 extend adjoining entire front and back surfaces of the flat conductors 11A-11D except connection portions 17. Where the flat conductors 11A-11D are rectangular, the four side surfaces of each of them need not be covered with any of the insulating sheet members 13. The four side surfaces, excluding the side surfaces of the connection portions 17, are covered with the insulating layer 15. Thus, of the plural laminated flat conductors 11A-11D, only the connection portions 17 are exposed.

The insulating layer 15 is formed around the plural flat conductors 11A-11D which are laid on each other with the insulating sheet members 13 interposed between them. For example, the insulating layer 15 is formed by powder coating (described later).

Since the plural flat conductors 11A-11D are laid on each other with the insulating sheet members 13 interposed between them, the vehicular wiring member 100 according to the first embodiment can accommodate multiple circuits. Although in this embodiment the vehicular wiring member 100 has the four flat conductors 11A-11D, the number of flat conductors is not limited to four.

The connection portions 17 of the respective flat conductors 11A-11D may be have a width that is equal to the overall width of the vehicular wiring member 100 divided by the number of flat conductors. As shown in FIG. 1, bolt fixing holes are formed through the respective connection portions 17.

For example, where the vehicular wiring member 100 according to the first embodiment is used as a power cable, as shown in FIG. 2, the flat conductors 11A-11D (four circuits) which are laid on each other in this order from the bottom may serve for transmission of, for example, −48 V, +48 V, +12 V, and −12 V, respectively. In this case, it is preferable that the flat conductors 11B and 110 which are adjacent to each other serve for transmission of voltages of the same polarity (i.e., +48 V and +12 V). Where the vehicular wiring member 100 has flat conductors of multiple circuits, this measure can enhance noise resistance.

Referring to FIG. 2, the vehicular wiring member 100 has the flat conductors 11A-11D each of which is made of an aluminum alloy and is, for example, 0.8 mm in thickness t and 70 mm in width W1. Thus, each of the flat conductors 11A-11D corresponds to a wire having a sectional area 56 mm$^2$.

For example, an insulating sheet member 13 that is 0.2 mm in thickness t1 is interposed between adjacent ones of the laminated four flat conductors 11A-11D and the flat conductors 11A-11D are covered with the insulating layer 15 which is 0.2 mm in thickness t2. Thus, the distance between the laminated flat conductors 11A-11D is equal to 0.2 mm. The overall width W and the overall thickness T of the vehicular wiring member 100 are equal to 70.4 mm and 4.2 mm, respectively. Thus, the thickness of the vehicular wiring member 100 can be made smaller than half of that of an aluminum wire that is 12.0 mm in standard final outer diameter and 50 $mm^2$ in sectional area.

Figure 3:
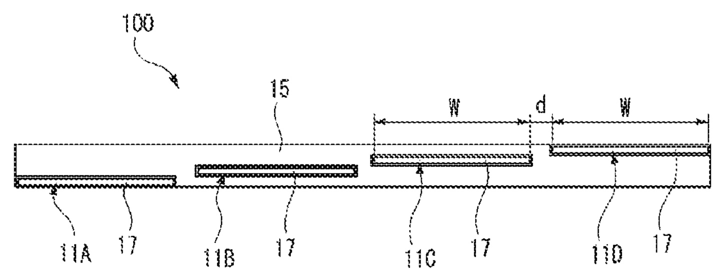
FIG. 3 is a front view of a left end portion of the wiring member shown in FIG. 1.
Figure 4:
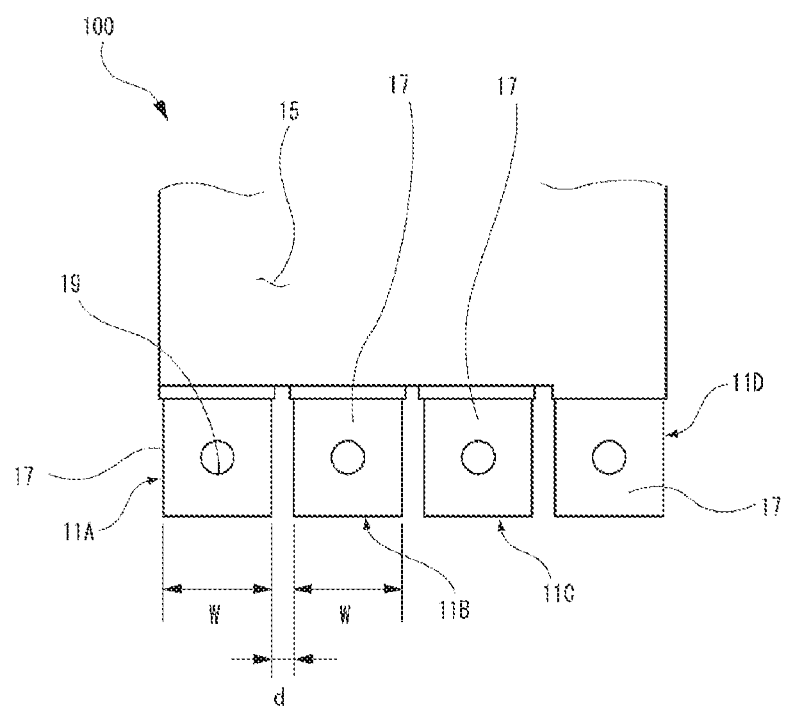
FIG. 4 is a plan view of the left end portion of the wiring member shown in FIG. 1.

FIGS. 3 and 4 are a front view and a plane view of a left end portion of the vehicular wiring member 100. Referring to FIG. 3, in the vehicular wiring member 100, the width w of each of the connection portions 17 of the flat conductors 11A-11D is equal to 16.0 mm. The interval d between adjacent ones of the connection portions 17 is set at 2.0 mm. The width w of each connection portion 17 is set at a minimum size that is necessary to avoid interference between a tool for fastening a nut to a bolt that is inserted in the bolt fixing hole 19 of the connection portion 17 and adjacent nuts that have already been fastened.

The thickness t of each of the flat conductors 11A-11D can be calculated according to the following Inequality (A):

$$t \geq S/\{n \times w + d(n-1)\} \quad \text{(A)}$$

where n is the number of circuits, w is the width of each of the connection portions 17 which are located at the two respective ends of each of the flat conductors 11A-11D, d is the interval between adjacent ones of the connection portions 17, and S is the necessary sectional area of the wiring member 100.

A necessary thickness t of each of the flat conductors 11A-11D can be calculated according to Inequality (A), that is, according to the sectional area of a conventional wire (corresponding to the necessary sectional area S of the wiring member 100), whereby replacement of a conventional wire with the vehicular wiring member 100 is facilitated.

Figure 5:
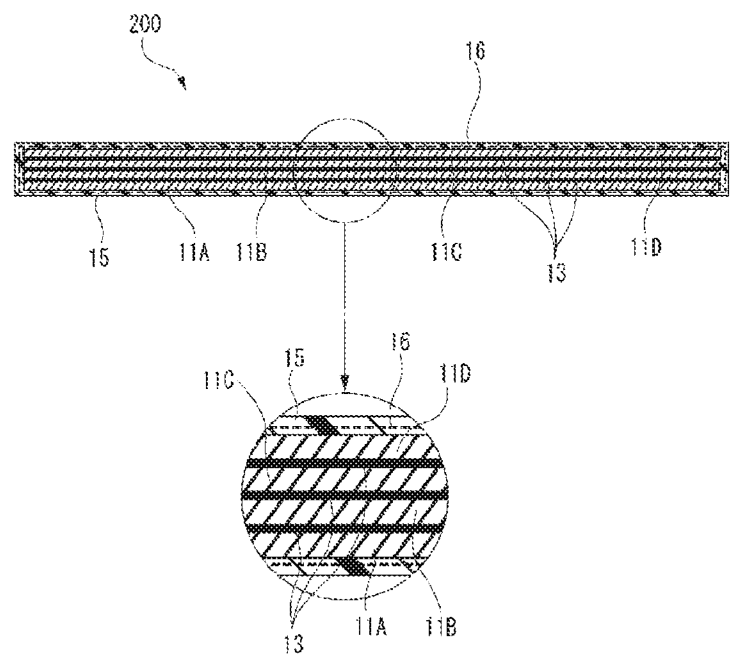
FIG. 5 is a transverse sectional view of a vehicular wiring member according to a second embodiment of the invention.

FIG. 5 is a transverse sectional view of a vehicular wiring member 200 according to a second embodiment of the invention. As shown in FIG. 5, the vehicular wiring member 200 is equipped with a shield layer 16 around plural flat conductors 11A-11D which are covered with an insulating layer 15. The shield layer 16 may be a braid or a foil. The outer surfaces of the shield layer 16 are covered with another insulating layer 15. In the vehicular wiring member 200 which is equipped with the shield layer 16, noise emission can be suppressed and influence of external noise can be avoided.

Figure 6:
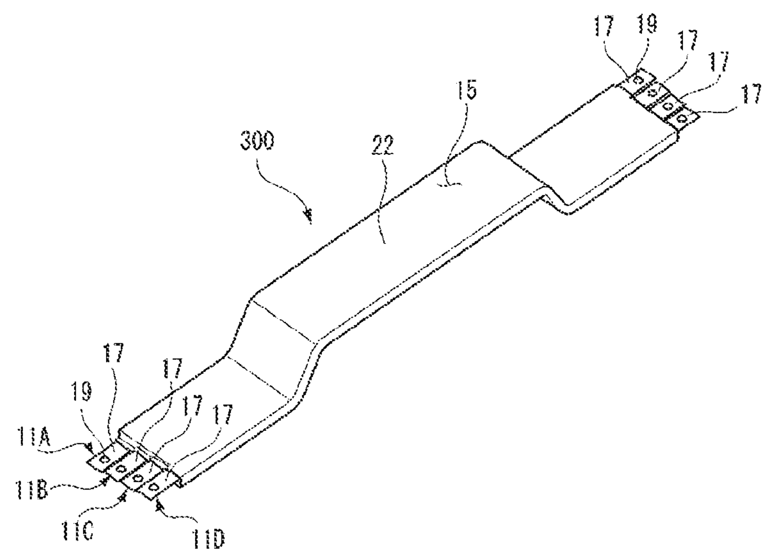
FIG. 6 is an overall perspective view of a vehicular wiring member according to a third embodiment of the invention.

FIG. 6 is an overall perspective view of a vehicular wiring member 300 according to a third embodiment of the invention. The vehicular wiring member 300 according to the third embodiment is a wiring member produced by bending it so that it extends along, for example, a vehicle floor panel (body panel) 21 (see FIG. 8). In the vehicular wiring member 300, as described later, before formation of an insulating layer 15, plural flat conductors 11A-11D which are laid on each other with flexible insulating sheet members 13 interposed between them are bent into a prescribed shape. The vehicular wiring member 300 is obtained by forming an insulating layer 15 around the thus-bent plural flat conductors 11A-11D.

The vehicular wiring member 300 has a convex bent portion 22 which strides a tunnel portion 24 of the floor panel 21. In the vehicular wiring member 300, the four flat conductors 11A-11D which are laid on each other with flexible insulating sheet members 13 interposed between them are covered with the insulating layer 15 by powder coating. The flat conductors 11A-11D are provided with four respective connection portions 17 at each end.

Figure 7:
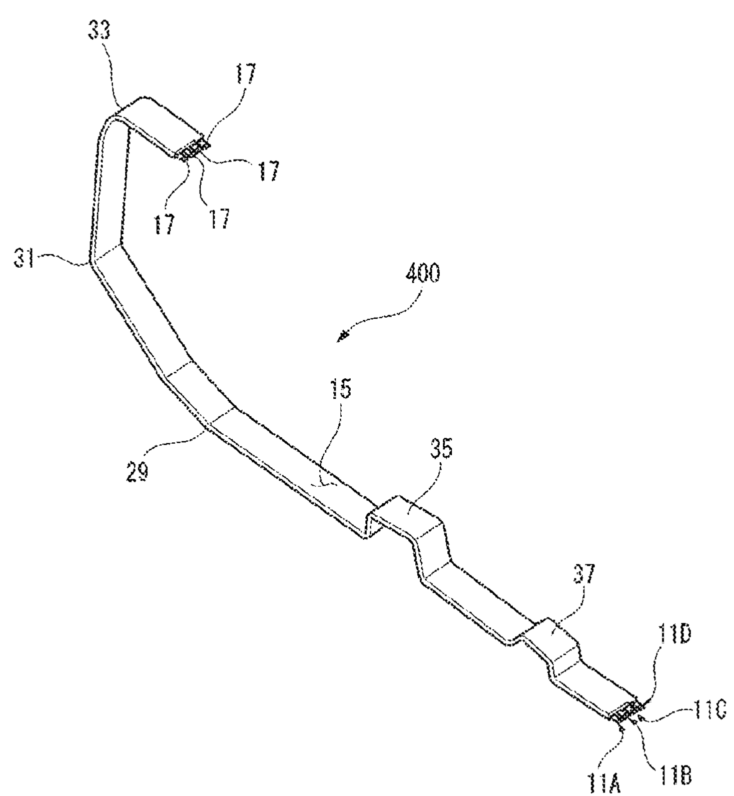
FIG. 7 is an overall perspective view of a vehicular wiring member according to a modification of the third embodiment of the invention.

FIG. 7 is an overall perspective view of a vehicular wiring member 400 according to a modification of the third embodiment of the invention. In the vehicular wiring member 400, as in the vehicular wiring member 300, before formation of an insulating layer 15, plural flat conductors 11A-11D which are laid on each other with flexible insulating sheet members 13 interposed between them are bent into a prescribed shape. The vehicular wiring member 400 is obtained by forming the insulating layer 15 around the thus-bent plural flat conductors 11A-11D.

The vehicular wiring member 400 is formed with plural bent portions 29, 31, 33, etc. so as to extend along the floor panel 21, and is also formed with plural convex bent portions 35 and 37 to stride respective cross members of the floor panel 21. In the vehicular wiring member 400, four long, flat conductors 11A-11D which are laid on each other with flexible insulating sheet members 13 interposed between them are covered with the insulating layer 15 by powder coating. The flat conductors 11A-11D are provided with four respective connection portions 17 at each end.

Figure 8:
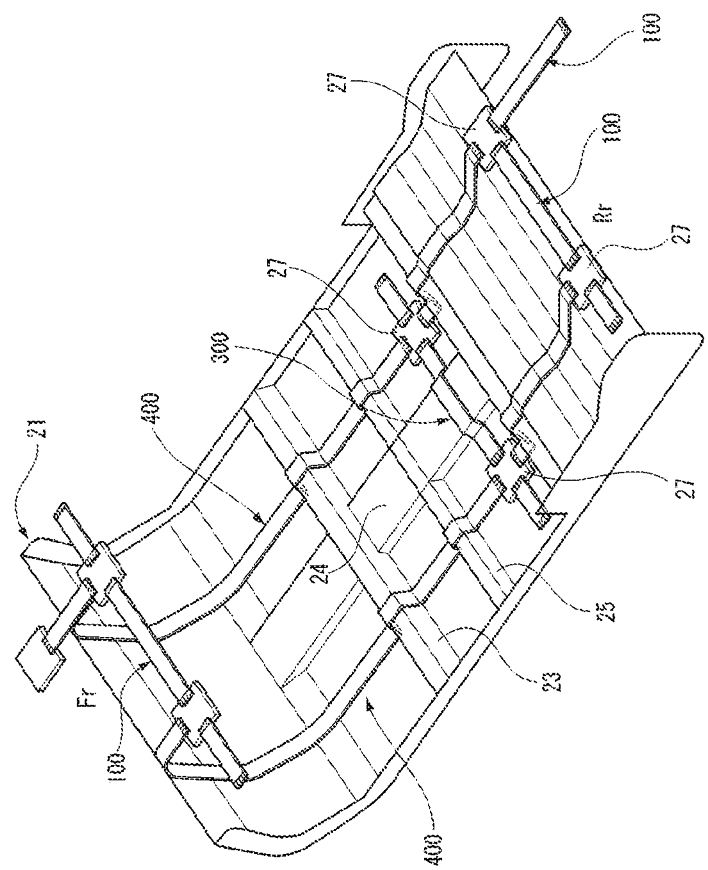
FIG. 8 is a perspective view showing an example of how plural kinds of vehicular wiring members are routed in a vehicle.

FIG. 8 is a perspective view showing an example of how plural kinds of vehicular wiring members are routed in a vehicle.

For example, when used as power cables, a pair of vehicular wiring members 400 are routed in the vehicle front-rear direction along a floor panel 21 so as to stride a front cross member 23 located on the front (Fr) side and a rear cross member 25 located on the rear (Rr) side. A vehicular wiring member 300 is routed in the vehicle lefty-right direction along the floor panel 21 so as to stride a vehicle tunnel portion 24, and is electrically connected to the pair of vehicular wiring members 400 via respective branching boxes 27. Furthermore, a vehicular wiring member 100 is electrically connected to the pair of vehicular wiring members 400 via respective branching boxes 27.

Power can be supplied to devices installed at various positions in the vehicle from a vehicle battery by the above vehicular wiring members 100, 300, and 400 which are routed along the floor panel 21 so as to extend to or in the vehicle front side and (or) rear side and are connected to each other.

Since each of the vehicular wiring members 100, 300, and 400 has the plural flat conductors 11A-11D which are laid on each other and covered with the thin insulating layers 15 formed by powder coating, it can be made thinner and lighter than conventional wires. The vehicular wiring members 100, 300, and 400 being thin can save the vehicle routing space. As such, the vehicular wiring members 100, 300, and 400 can be routed even in regions that require space saving (e.g., the space between floor panel 21 and a floor mat) where the routing space is desired to be minimized to meet a need of enlargement of the vehicle compartment space.

Next, a description will be made of a manufacturing method of the vehicular wiring members according to the above embodiments. FIGS. 9A to 9D are a process diagram illustrating the procedure of a manufacturing method of the vehicular wiring member 300 shown in FIG. 6.

The manufacturing method of the vehicular wiring member 300 according to this embodiment includes an insulation step of inserting an insulating sheet member 13 between the adjacent ones of plural flat conductors 11A-11D to electrically insulate the flat conductors 11A-11D from each other, a lamination step of laminating the flat conductors 11A-11D in the thickness direction, and an insulating layer forming step of forming an insulating layer 15 around the laminated flat conductors 11A-11D.

Figure 9A:
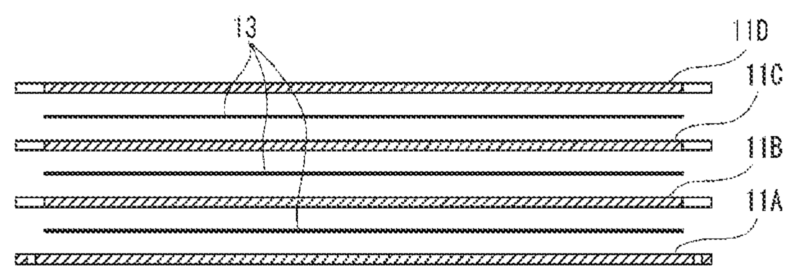
FIGS. 9A to 9D are a process diagram illustrating the procedure of a manufacturing method of the vehicular wiring member shown in FIG. 6.
Figure 9B:
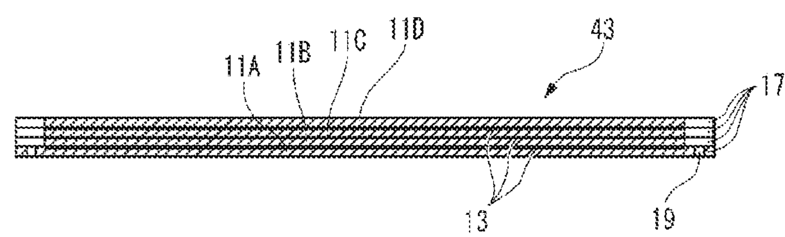
Figure 9C:
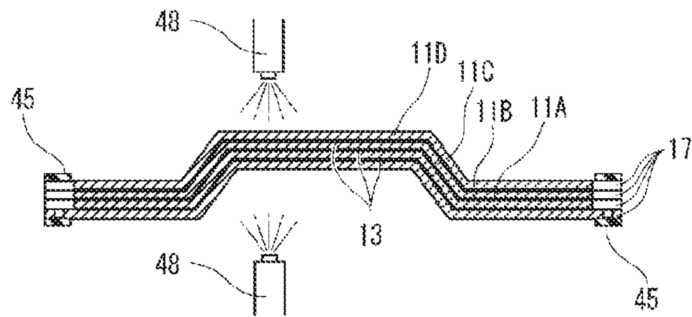

In the lamination step of laminating the plural flat conductors 11A-11D in the thickness direction, a necessary number of (in this example, four) flat conductors 11A-11D are prepared as shown in FIG. 9A. Before being subjected to bending, the plural flat conductors 11A-11D are laid on each other with the insulating sheet members 13 interposed between the flat conductors 11A-11D to electrically insulate the flat conductors 11A-11D from each other. As a result, a laminated flat conductor 43 is formed as shown in FIG. 9B.

Before formation of an insulating layer 15 around the laminated flat conductor 43, the laminated flat conductor 43 is bent into such a shape as to extend along the vehicle floor panel 21 etc. (see FIG. 9C). In particular, the laminated flat conductor 43 is bent taking into consideration that after the bending it will recover from the bending deformation to some extent due to springing-back.

Figure 9D:
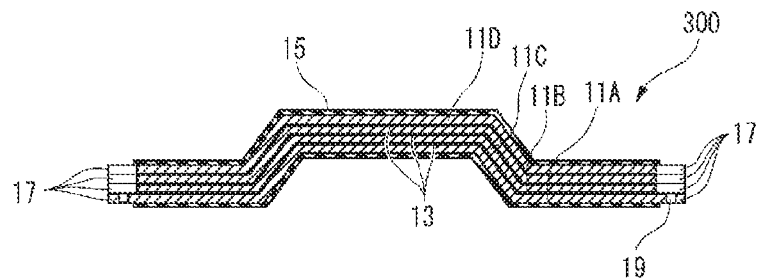

After being subjected to the bending step, the outer surfaces of the laminated flat conductor 43 is subjected to powder coating, whereby as shown in FIG. 9D a vehicular wiring member 300 is obtained whose outer surfaces are formed with an insulating layer 15.

In the manufacturing method of the vehicular wiring member 300 according to the embodiment, a masking step may be executed before the coating step. In the masking step, for example, the surfaces of two end portions to become connection portions 17 of the laminated flat conductor 43 are masked using masking tapes 45 or the like (see FIG. 9C).

Bolt fixing holes 19 have been formed through the masked two end portions of the laminated flat conductor 43 in advance by drilling. No parts of the insulating layer 15 are formed on the masked two end portions of the laminated flat conductor 43. Thus, the exposed portions, at the two ends, of the laminated flat conductor 43 can be used as connection terminals. The connection terminals can be connected directly (electrically) to a counterpart harness, battery electrodes, alternator terminals, or the like by fastening bolts to them using the bolt fixing holes 19.

The insulating layer 15 is formed on the surfaces of the bent laminated flat conductor 43 by powder-coating an insulative resin material. This powder coating is mainly classified into two methods, that is, an electrostatic coating (spraying) method and a fluidized bed coating (dip coating) method.

Figure 10:
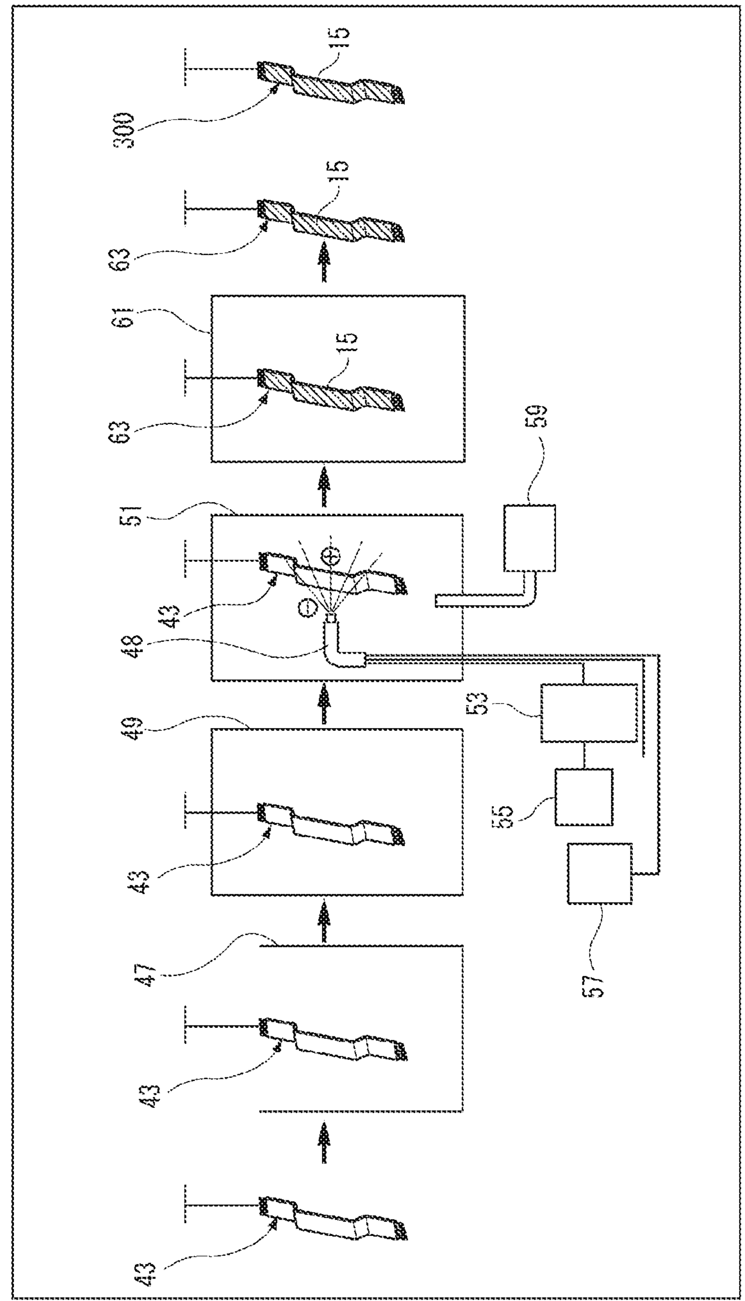
FIG. 10 is a process diagram illustrating the procedure of electrostatic coating.

FIG. 10 is a process diagram illustrating the procedure of the electrostatic coating method. In the electrostatic coating method, paint is charged by a spray gun 48 and applied to a grounded coating target electrostatically.

In the electrostatic coating method shown in FIG. 10, first the laminated flat conductor 43 is cleaned in a preprocessing tank 47 and then dried in a drying furnace 49.

Subsequently, in a powder coating booth 51, powder paint that is supplied from a powder paint supply tank 53 is sprayed using pressure-fed air that is fed from a compressor 55. At this time, the paint is charged by the spray gun 48 to which a high-voltage generator 57 is connected. On the other hand, the laminated flat conductor 43 is grounded, whereby the surfaces of the laminated flat conductor 43 are covered with a coated film of powder paint. A collecting device 59 is connected to the powder coating booth 51.

After the coating with the powder paint, the laminated flat conductor 43 is heated in a baking/drying furnace 61, whereby the coated film is completed. Cooling is then performed, whereby a coated laminated flat conductor 63 is obtained. The coated laminated flat conductor 63 is subjected to post-processing such as removal of the masking tapes 45 and thereby becomes a vehicular wiring member 300. Whereas in the fluidized bed coating method (described later) it is difficult to manage the film thickness, in the electrostatic coating method the thickness of a coated film can be managed easily so as to be equal to about 50 μm.

A thermosetting paint is used in the electrostatic coating method. When the thermosetting paint is heated, a chemical reaction (crosslinking) occurs therein and its characteristics are thereby changed. Since various kinds of characteristics can be added by crosslinking reactions, a paint that is suitable for a use can be selected. Common example base resins usable are a polyester resin, an acrylic resin, an epoxy resin, and a hybrid (epoxy/polyester) resin.

Figure 11:
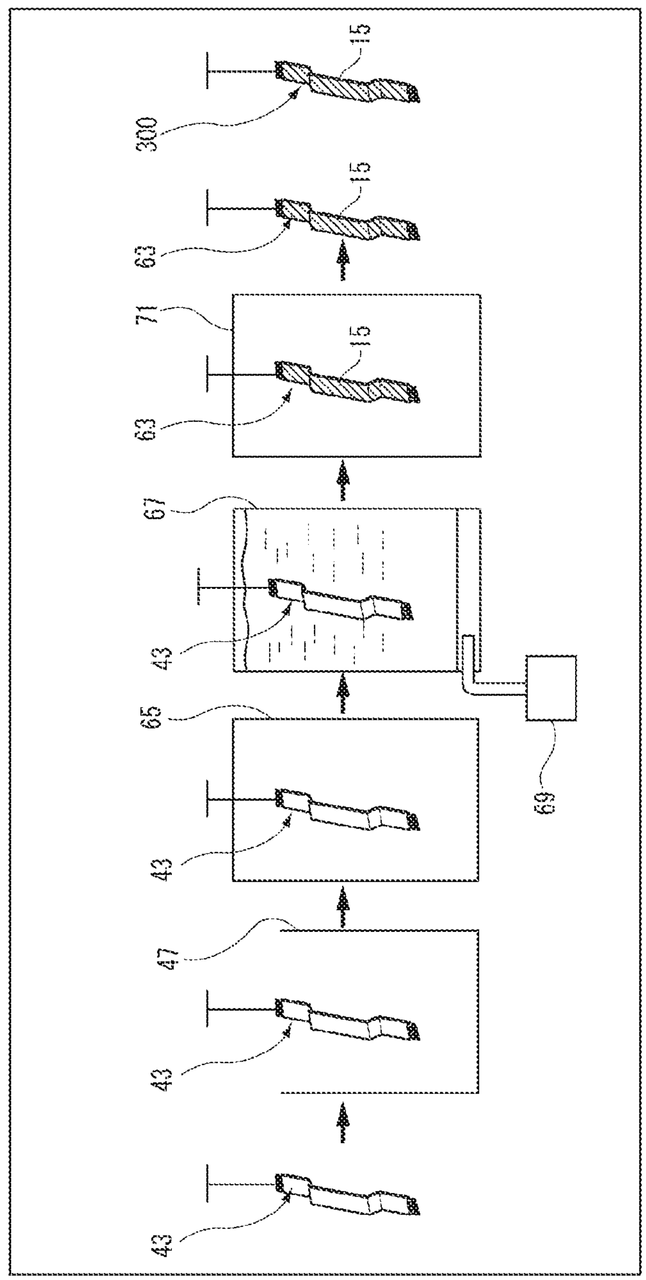
FIG. 11 is a process diagram illustrating the procedure of the fluidized bed coating method.

FIG. 11 is a process diagram illustrating the procedure of the fluidized bed coating method. In the fluidized bed coating method, first a laminated flat conductor 43 is cleaned in a preprocessing tank 47 and then subjected to preliminary heating in a preliminary heating furnace 65.

The laminated flat conductor 43 that has been subjected to the preliminary heating is dipped in paint that occupies a flow dip tank 67 and is flowing because it is supplied with compressed air 69 through a perforated plate that is disposed at the bottom of the flow dip tank 67. In the flow dip tank 67, paint is fusion-bonded to the laminated flat conductor 43 by heat and forms a thick coated film.

To increase smoothness, a coated laminated flat conductor 63 may be caused to pass through a post-heating tank 71. The resulting coated laminated flat conductor 63 is subjected to post-processing such as removal of masking tapes 45 and thereby becomes a vehicular wiring member 300. In the fluidized bed coating method, a film thickness of 200 to 500 μm can be obtained.

A thermoplastic powder paint is used in the fluidized bed coating method. Main example thermoplastic powder paints are resins such as vinyl chloride, polyester, and nylon. Thermoplastic paints have features that they are softened and changed in shape when heated and are stabilized in shape when cooled. On the other hand, no heat-induced chemical change occurs in thermoplastic powder paints. Thus, they are softened and changed in shape repeatedly as they are heated. This is therefore not a baking process as employed for thermosetting paints.

The manufacturing method of a vehicular wiring member according to the embodiment may further include a shield layer forming step of forming a shield layer 16 around the coated laminated flat conductor 63 produced by the powder coating. In the shield layer forming step, the coated laminated flat conductor 63 is covered with a shield layer 16 which is a braid or a foil. If necessary, the outer surfaces of the shield layer 16 are covered with another insulating layer 15 by powder coating. In a vehicular wiring member that is equipped with the shield layer 16, noise emission can be suppressed and influence of external noise can be avoided.

Next, advantages of the vehicular wiring members 100, 200, 300, and 400 according to the embodiments having the above-described configurations will be described. In the vehicular wiring members 100, 200, 300, and 400, the flat conductors 11A-11D are laid on each other in the thickness direction with the insulating sheet members 13 interposed between them. With this configuration, a vehicular wiring member having plural circuits can be constructed while the thickness is made smaller than in conventional thick wires. Unlike in conventional thick wires, the flat conductors 11A-11D need not be arranged in the direction that is perpendicular to the thickness direction. Thus, no increase occurs in the routing space in the width direction of the vehicular wiring member 100, 200, 300, or 400.

In the vehicular wiring member 200 which is equipped with the shield layer 16, noise emission can be suppressed and influence of external noise can be avoided.

In the manufacturing methods of the vehicular wiring members 100, 200, 300, and 400 according to the embodiment, when the plural flat conductors 11A-11D are laid on each other, the insulating sheet members 13 are interposed between the flat conductors 11A-11D to electrically insulating them from each other. As a result, the flat conductors 11A-11D can be insulated electrically from each other easily and reliably.

In the manufacturing methods of the vehicular wiring members 300 and 400, the laminated flat conductors 11A-11D are bent in advance so as to extend along the floor panel 21. That is, because of the insertion of the insulating sheet members 13, the laminated flat conductors 11A-11D (i.e., laminated flat conductor 43) can be bent together into such a shape as to extend along the floor panel 21. The bent laminated flat conductor 43 is covered with the insulating layer 15.

In general, the surface of the floor panel 21 along which a wiring member is routed is undulated in a complicated manner because of the presence of the front cross member 23, the rear cross member 25, etc.

Figure 12:
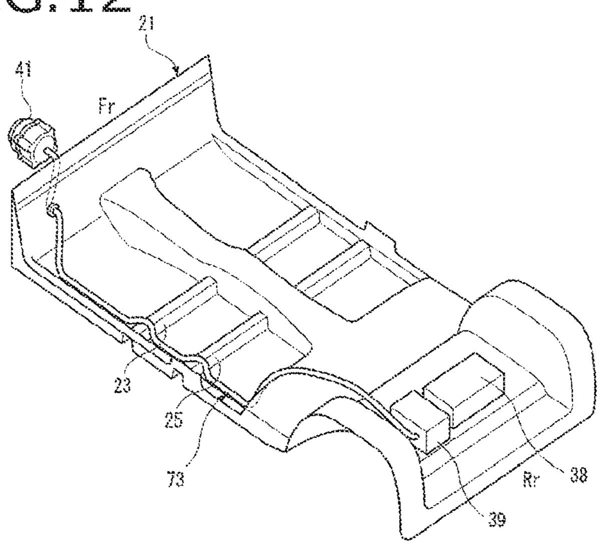
FIG. 12 is a perspective view showing an example manner of routing of a thick wire in a vehicle.

For example, where as shown in FIG. 12 a thick wire 73 is routed along the floor panel 21 to connect a front alternator 41 etc. to a fuse box 39 which is connected to a rear battery 38, the thick wire 73 stride convex portions such as the front cross member 23 and the rear cross member 25. Thus, the interval between the floor panel 21 and, for example, an interior member disposed over it should be longer than at least the height of the thick wire 73 as routed. Furthermore, since it is difficult to bend the thick wire 73 so that it conforms to the convex portions such as the front cross member 23 and the rear cross member 25, also in concave portions the height of the interior member cannot be lowered being obstructed by the thick wire 73.

In contrast, in the vehicular wiring members 300 and 400 having the above-described configurations, the laminated flat conductors 11A-11D (laminated flat conductor 43) are bent in advance with the insulating sheet members 13 interposed between them, that is, the laminated flat conductors 11A-11D can be bent easily so as to conform to the convex and concave surfaces, having complicated shapes, of the floor panel 21. As a result, free of restrictions as imposed by the thick wire 73 which cannot be bent easily, the height of the interior member can be lowered even in the concave portions (see FIG. 8).

The insulating layer 15 is formed by, for example, powder coating, on the surfaces of the vehicular wiring member 300 or 400 in which the flat conductors 11A-11D has been laminated on each other with the insulating sheet members 13 interposed between them. By virtue of the powder coating, the insulating layer 15 can be formed at a thickness of 0.1 to 0.2 mm, for example, in contrast to 1 to 2 mm that occurs in the case of conventional extrusion molding. As such, the vehicular wiring members 300 and 400 can reduce the routing space, for example, the interval between the floor panel 21 and the interior member.

In the manufacturing method of the vehicular wiring member 200, after formation of an insulating layer 15 around the plural flat conductors 11A-11D which are laid on each other with the insulating sheet members 13 interposed between them, the insulating layer 15 is covered with the shield layer 16 and, if necessary, the shield layer 16 is covered with another insulating layer 15 by powder coating. In this manner, the vehicular wiring member 200 having a shield function can be manufactured easily using the same equipment (e.g., powder coating machine).

As such, the vehicular wiring members 100, 200, 300, and 400 according to the embodiments can be thinner and lighter than the conventional thick wire 73 and can reduce the routing space.

The manufacturing methods of the vehicular wiring members 100, 200, 300, and 400 according to the embodiment make it possible to form the insulating layer 15 as part of the vehicular wiring member 100, 200, 300 or 400 which is thinner than conventional coated wires formed by extrusion molding and is bent so as to extend along the floor panel 21.

The invention is not limited to the above embodiments. Combining components of the embodiments and modifications and applications made by those skilled in the art on the basis of this specification and known techniques are within expectations of the invention and are included in the intended scope of protection.

For example, the method for forming the insulating layer 15 around the flat conductors 11A-11D is not limited to the above-described powder coating and may be any of various methods such as a method of dipping a laminated flat conductor 43 in paint (dip coating).

In the routing example of FIG. 8, the plural vehicular wiring members 100, 300, and 400 are electrically connected to each other via the branching boxes 27, it goes without saying that a single vehicular wiring member may be routed in the vehicle front-rear direction.

Furthermore, although the above embodiments are directed to the vehicular wiring members 100, 300, and 400 which are used as vehicle power cables, it goes without saying that the wiring cable according to the invention is not limited to wiring cables of that kind and the invention can be applied to various kinds of wiring cables.

Figure 13A:
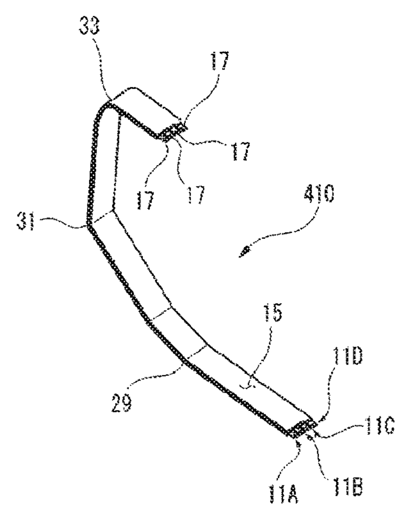
FIGS. 13A and 13B are perspective views of a first wiring member and a second wiring member, respectively, that are produced by dividing the vehicular wiring member shown in FIG. 7.
Figure 13B:
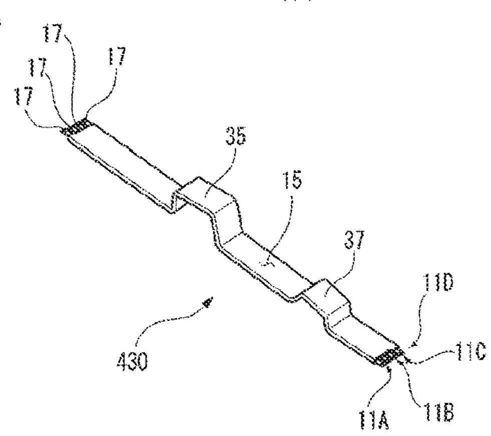
Figure 14:
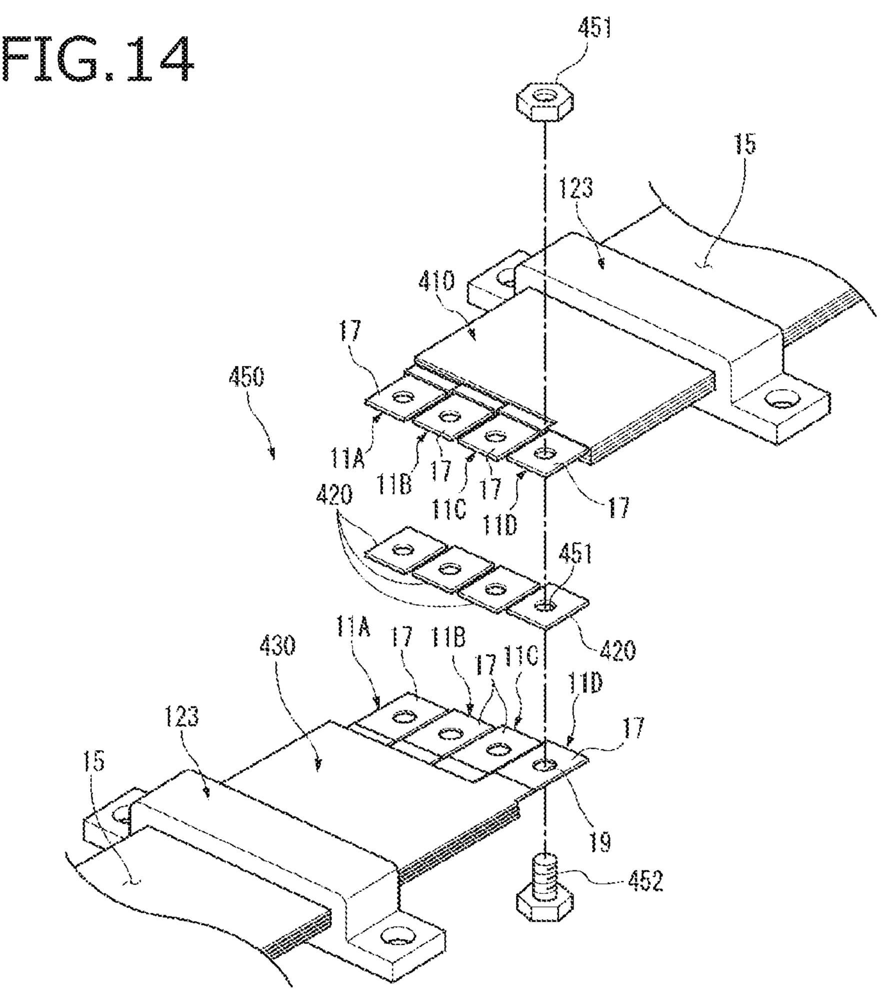
FIG. 14 is a perspective view of a connection portion of the first wiring member and the second wiring member shown in FIGS. 13A and 13B which have a wiring member connection structure according to a fourth embodiment of the invention.

FIGS. 13A and 13B are perspective views of a first wiring member 410 and a second wiring member 430, respectively, that are produced by dividing the vehicular wiring member 400 shown in FIG. 7. FIG. 14 is a perspective view of a connection portion 450 of the first wiring member 410 and the second wiring member 430 shown in FIGS. 13A and 13B which have a wiring member connection structure according to a fourth embodiment of the invention.

As described above, the vehicular wiring member 400 is shaped so as to be suitable for the installation location. Having the four flat conductors 11A-11D which are laid on each other, the vehicular wiring member 400 is a structural body that is high in stiffness. Thus, where the length in the vehicle front-rear direction is longer than or equal to, for example, half of the vehicle length as in the case of the vehicular wiring member 400, it is preferable that the vehicular wiring member 400 be manufactured in such a manner as to be divided into the first wiring member 410 and the second wiring member 430 shown in FIGS. 13A and 13B, respectively. In this case, it is necessary to electrically connect the first wiring member 410 and the second wiring member 430 at the connection portion 450. Portions of the first wiring member 410 and the second wiring member 430 having the same ones in the vehicular wiring member 400 are given the same reference symbols as the latter, and detailed descriptions therefor will be omitted.

As shown in FIG. 14, in the connection portion 450 of the first wiring member 410 and the second wiring member 430, spacers 420 for absorbing gaps that are formed due to height differences between two sets of connection portions 17 are sandwiched between the connection portions 17 of the flat conductors 11A-11D, bundled by a clamp 123, of the first wiring member 410 and the connection portions 17 of the flat conductors 11A-11D, bundled by another clamp 123, of the second wiring member 430. The two sets of connection portions 17 are fastened to each other by bolts 452 and nuts 451.

Figure 15:
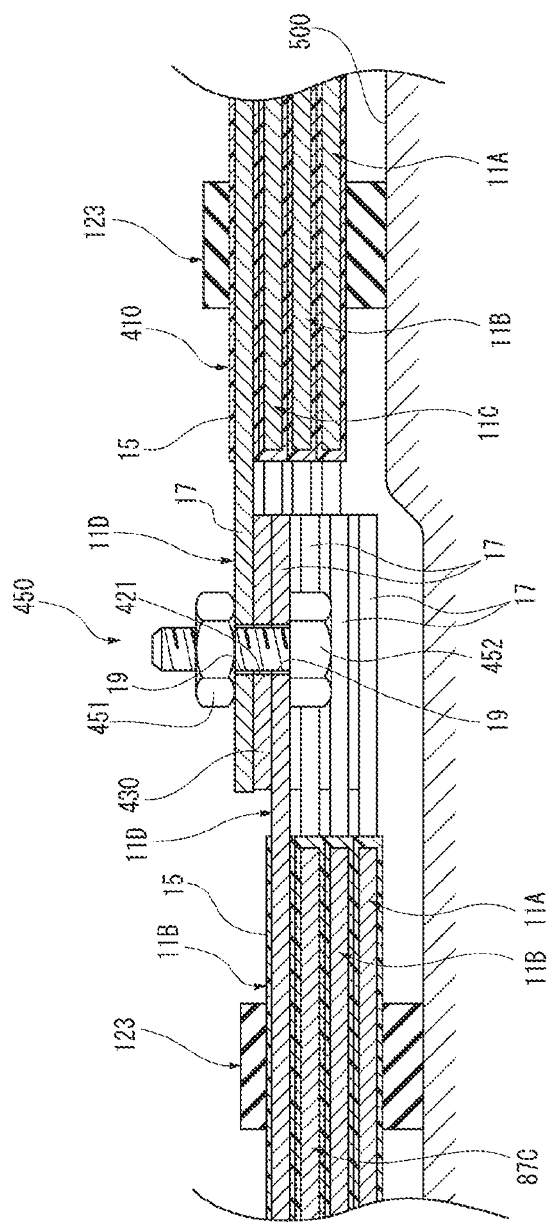
FIG. 15 is a sectional view of an essential part including the connection portion of the first wiring member and the second wiring member shown in FIG. 14.

As shown in FIG. 15, there may occur a case that a height difference (step) exists between an installation location (surface) of the first wiring member 410 and an installation location (surface) of the second wiring member 430 on an attachment surface 500 of a vehicle body panel or the like. Even if the attachment surface 500 itself has no step, gaps may be formed between the connection portions 17 of the first wiring member 410 and the connection portions 17 of the second wiring member 430 due to assembling allowances etc. of the first wiring member 410 and the second wiring member 430. If the sets of connection portions 17 having such gaps were fixed to each other forcibly by bolt fastening or the like, sufficient contact areas might not be secured to lower the reliability of the connections or produce a bending load in the thickness direction, resulting in deformation or damaging of a connection portion 17.

In view of the above, where there exists a height difference between the installation locations of the first wiring member 410 and the second wiring member 430 which are installed on the attachment surface 500 of a vehicle panel or the like, the spacers 420 having such a prescribed thickness as to be able to absorb gaps that are formed due to the height difference between the first wiring member 410 and the second wiring member 430 are interposed between the sets of connection portions 17. The spacers 420 absorb gaps that are formed due to the height difference and can thereby secure necessary contact areas. Furthermore, a bending load is not prone to be produced in the thickness direction at each position where connection portions 17 are fixed to each other by bolt fastening, whereby deformation or damaging of the connection portions 17 can be prevented.

Each spacer 420 is shaped like a rectangular plate and is formed with a through-hole through which a bolt 452 is to penetrate. Plural kinds of spacers 420 are used as appropriate to absorb gaps that are formed due to a height difference between the first wiring member 410 and the second wiring member 430.

Figure 16:
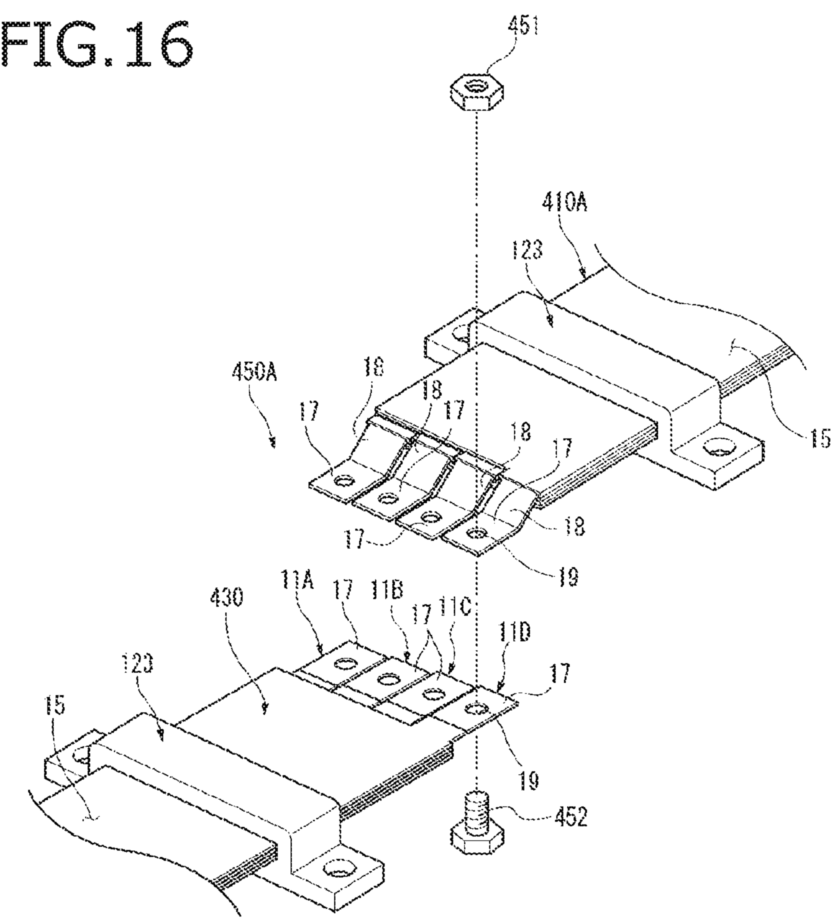
FIG. 16 is a perspective view of a connection portion of a first wiring member and a second wiring member which have a wiring member connection structure according to a fifth embodiment of the invention.
Figure 17:
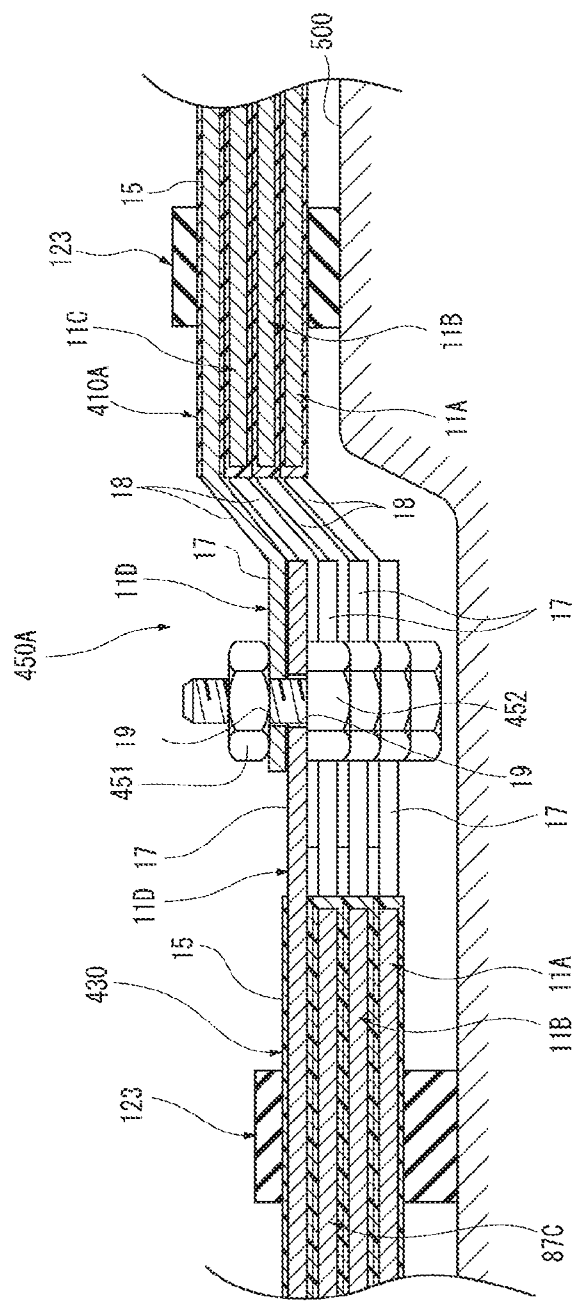
FIG. 17 is a sectional view of an essential part including the connection portion of the first wiring member and the second wiring member shown in FIG. 16.

FIG. 16 is a perspective view of a connection portion 450A of a first wiring member 410A and a second wiring member 430 which have a wiring member connection structure according to a fifth embodiment of the invention. FIG. 17 is a sectional view of an essential part including the connection portion 450A of the first wiring member 410A and the second wiring member 430 shown in FIG. 16.

As shown in FIG. 16, in the connection portion 450A of the first wiring member 410A and the second wiring member 430, the connection portions 17 of the flat conductors 11A-11D, bundled by a clamp 123, of the first wiring member 410A are formed with bent portions 18 for absorbing gaps that are formed due to height differences with respect to installation locations of the flat conductors 11A-11D of the second wiring member 430.

More specifically, as shown in FIG. 17, where there exists a height difference between the installation locations of the first wiring member 410A and the second wiring member 430 which are installed on the attachment surface 500, the connection portions 17 of the first wiring member 410A are formed in advance with respective crank-shaped bent portions 18 that are suitable for gaps that are produced by a height difference between the first wiring member 410A and the second wiring member 430 so that the connection portions 17 of the first wiring member 410A absorb the gaps and come into surface contact with the respective connection portions 17 of the second wiring member 430.

Formed with the respective bent portions 18, the connection portions 17 of the first wiring member 410A absorb the gaps with respect to the connection portions 17 of the second wiring member 430 and can thereby secure necessary contact areas. Furthermore, a bending load is not prone to be produced in the thickness direction at each position where connection portions 17 are fixed to each other by bolt fastening, whereby deformation or damaging of the connection portions 17 can be prevented.

Since each connection portion 17 of the first wiring member 410A is formed with a crank-shaped bent portion 18, the connection portion 17 allows escape of stress in the direction in which the first wiring member 410A extends straightly and can thereby prevent damaging of the connection portion 17.

The bent portion 18 may be formed in each connection portion 17 of the second wiring member 430 instead of each connection portion 17 of the first wiring member 410. As a further alternative, the bent portion 18 may be formed in both of each connection portion 17 of the first wiring member 410 and each connection portion 17 of the second wiring member 430. The connection portions 17 of the first wiring member 410A may be connected to the respective connection portions 17 of the second wiring member 430 by welding or soldering.

Like the vehicular wiring member 200 shown in FIG. 5, each of the first wiring member 410 or 410A and the second wiring member 430 may be equipped with a shield layer 16 around the flat conductors 11A-11D which are covered with the insulating layer 15.

Figure 18:
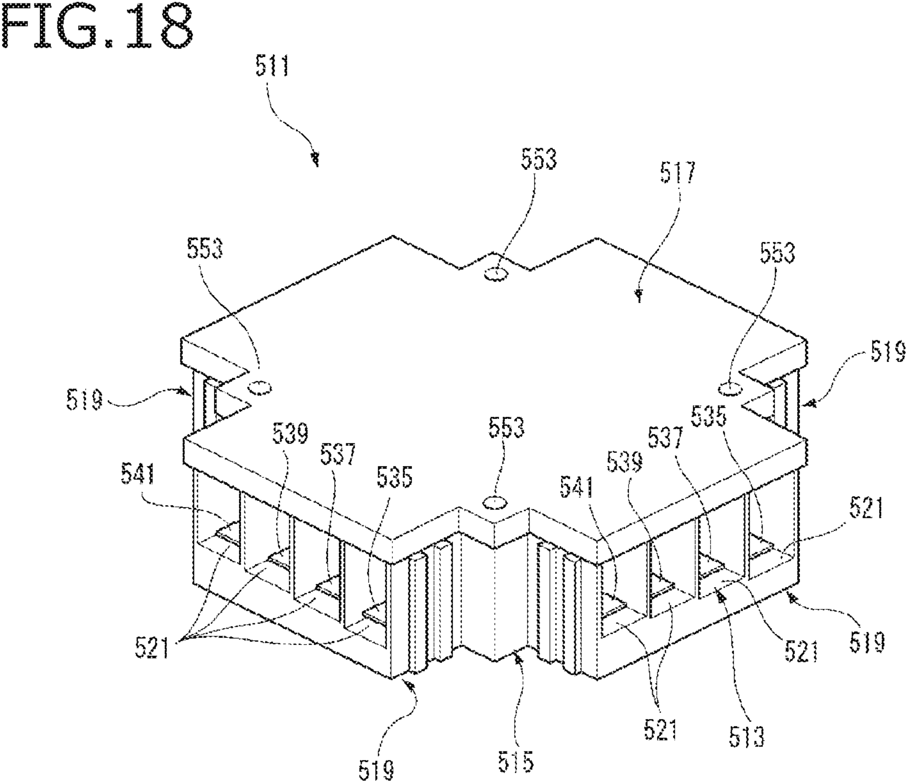
FIG. 18 is a perspective view showing an appearance of a branching box which houses a branching connection member for electrically connecting plural vehicular wiring members to each other.
Figure 19:
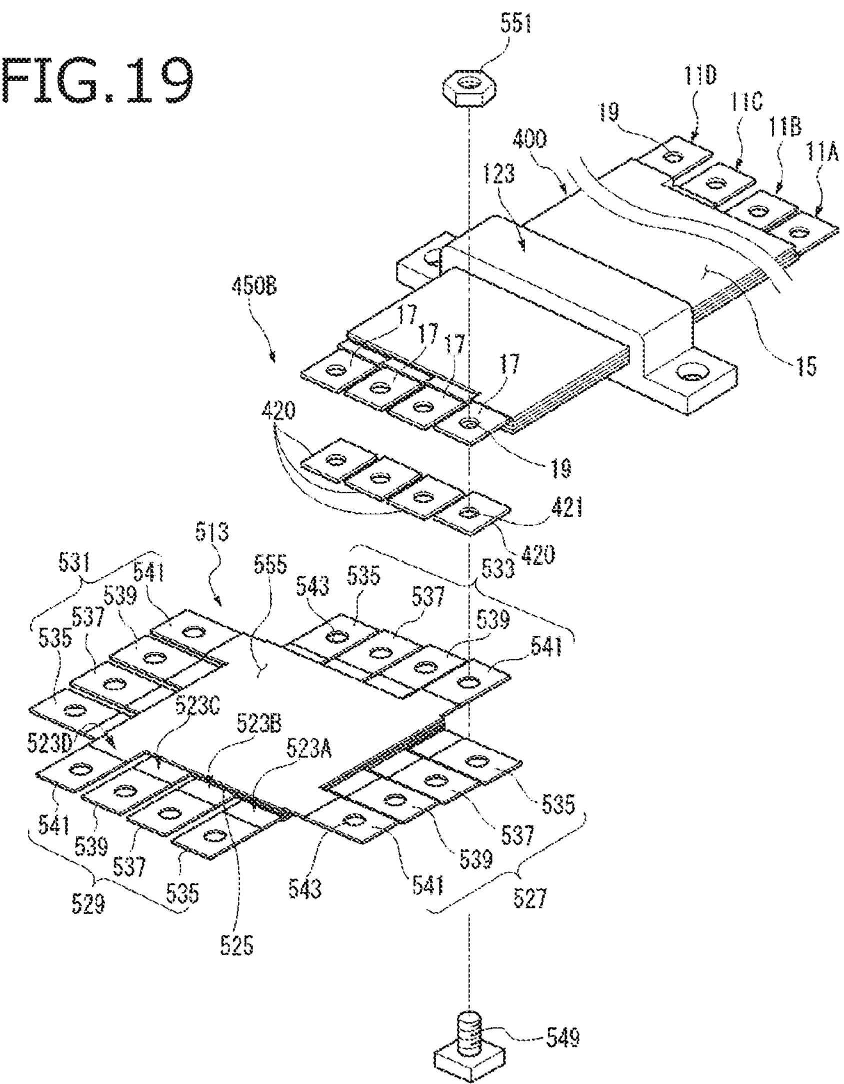
FIG. 19 is a perspective view of a vehicular wiring member and the branching connection member housed in the branching box shown in FIG. 18 and illustrates a connection structure for wiring members according to a sixth embodiment of the invention.
Figure 20:
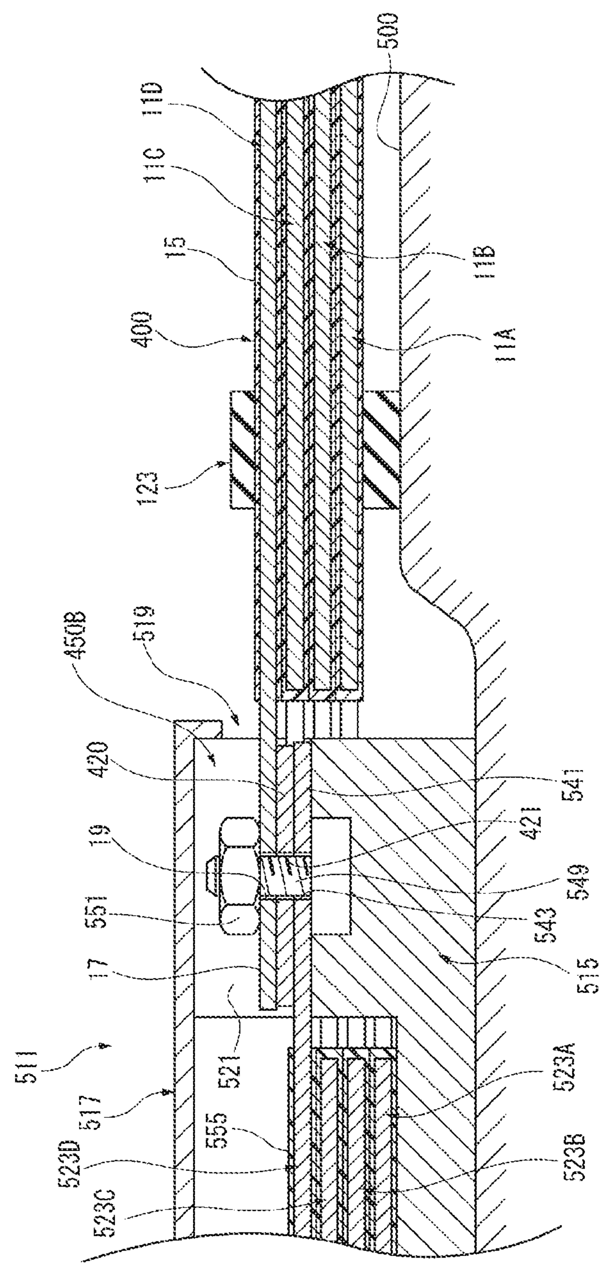
FIG. 20 is a sectional view of an essential part including a connection portion of connection portions and connection pieces shown in FIG. 19.

FIG. 18 is a perspective view showing an appearance of a branching box 511 which houses a branching connection member 513 for electrically connecting plural vehicular wiring members 100, 300, and 400 to each other. FIG. 19 is a perspective view of the vehicular wiring member 400 and the branching connection member 513 housed in the branching box 511 shown in FIG. 18 and illustrates a wiring member connection structure according to a sixth embodiment of the invention. FIG. 20 is a sectional view of an essential part including a connection portion 450B of the connection portions 17 and first to fourth connection pieces 535, 537, 539, and 541 shown in FIG. 19.

The branching box 511 is a housing case which houses the branching connection member 513 for electrically connecting the vehicular wiring members 100, 300, and 400 to each other. The branching box 511 is equipped with a housing box 515 and a lid case 517 which cover the branching connection member 513. The branching box 511 is generally shaped like a cuboid that is small in height. The branching box 511 has four connection opening portions 519 which are located at the four respective sides and project sideways. Each connection opening portion 519 has plural (in the illustrated example, four) connection openings 521 in each of which first to fourth connection pieces 535, 537, 539, and 541 are disposed, respectively. The flat conductors 11A-11D of, for example, the vehicular wiring member 400 (described later) are connected to the respective connection pieces 535, 537, 539, and 541 of each connection opening 521.

As shown in FIG. 19, the branching connection member 513 which is housed in the branching box 511 is formed by laminating plural flat plates 523A-523D made of a conductive material. The number of flat plates 523A-523D is equal to that of flat conductors 11A-11D of, for example, the vehicular wiring member 400 to be connected to them. In the embodiment, four flat plates 523A-523D are provided because the number of flat conductors 11A-11D of, for example, the vehicular wiring member 400 is four.

In the embodiment, the flat plates 523A-523D, each of which is generally square in a plan view, have groups of first to fourth connection pieces 535, 537, 539, and 541 which project sideways from their respective outer circumferences 525 and are arranged in the lateral direction so as not to overlap with each other in the lamination direction. The first to fourth connection pieces 535, 537, 539, and 541 of each group are connected to the respective flat conductors 11A-11D of, for example, the vehicular wiring member 400. Plural groups of first to fourth connection pieces 535, 537, 539, and 541 are provided. In the illustrated example, the branching connection member 513 is provided with, at the respective sides, a total of four groups of connection portions, that is, a first-group connection portion 527, a second-group connection portion 529, a third-group connection portion 531, and a fourth-group connection portion 533, each of which is provided with first to fourth connection pieces 535, 537, 539, and 541. The first to fourth connection pieces 535, 537, 539, and 541 are formed with bolt fixing holes 543 for bolt fastening of the flat conductors 11A-11D of, for example, the vehicular wiring member 400, respectively.

Stud bolts 549 are planted at the bottoms of the respective connection openings 521 of each connection opening portion 519. The stud bolts 549 are inserted into the respective bolt fixing holes 543 of the first to fourth connection pieces 535, 537, 539, and 541, respectively. Fixing nuts 551 are threadedly engaged with the stud bolts 549 that penetrate through the bolt fixing holes 543, respectively. Thus, the flat conductors 11A-11D which are formed with the respective bolt fixing holes 19 can be fastened to the first to fourth connection pieces 535, 537, 539, and 541, respectively.

The stud bolts 549 also have a role of fixing the branching connection member 513 to the housing box 515. The lid case 517 is fixed to the housing box 515 by case fixing screws 553, whereby the branching connection member 513 which is fixed to the housing box 515 in the above manner is housed in the branching box 511 and most of the former is covered with the latter.

In the branching connection member 513, insulating layers 555 for insulating the plural flat plates 523A-523D electrically from each other are interposed between the flat plates 523A-523D. An insulating layer 555 is formed on at least one of the front surface and the back surface of each of the flat plates 523A-523D by powder coating.

As shown in FIG. 19, spacers 420 for absorbing gaps that are formed due to height differences between the connection portions 17 of the flat conductors 11A-11D, bundled by a clamp 123, of the vehicular wiring member 400, for example, and the first to fourth connection pieces 535, 537, 539, and 541 which project sideways from the outer circumferences 525 of the flat plates 523A-523D and are arranged in the lateral direction so as not to overlap with each other in the lamination direction are sandwiched between the connection portions 17 of the flat conductors 11A-11D and the first to fourth connection pieces 535, 537, 539, and 541, respectively.

That is, as shown in FIG. 20, in the connection portion 450B of the vehicular wiring member 400 and the branching connection member 513, the spacers 420 for absorbing gaps that are formed due to height differences between the connection portions 17 of the flat conductors 11A-11D, bundled by a clamp 123, of the vehicular wiring member 400, for example, and the first to fourth connection pieces 535, 537, 539, and 541 which project sideways from the outer circumferences 525 of the flat plates 523A-523D and are arranged in the lateral direction so as not to overlap with each other in the lamination direction are sandwiched between the connection portions 17 of the flat conductors 11A-11D and the first to fourth connection pieces 535, 537, 539, and 541, respectively.

Where as shown in FIG. 20 there exists a height difference between the installation locations of the vehicular wiring member 400 and the branching box 511 housing the branching connection member 513 (the laminate of the flat plates 523A-523D) which are installed on the attachment surface 500 of a vehicle panel or the like, the spacers 420 having such a prescribed thickness as to be able to absorb gaps that are formed due to the height difference between the vehicular wiring member 400 and the branching connection member 513 are interposed between the connection portions 17 of the former and the first to fourth connection pieces 535, 537, 539, and 541 of the latter. The spacers 420 absorb gaps that are formed due to the height difference between the vehicular wiring member 400 and the branching connection member 513, and can thereby secure necessary contact areas. Furthermore, a bending load is not prone to be produced in the thickness direction at each position where a connection portion 17 is connected to a connection piece 535, 537, 539, or 541, whereby deformation or damaging of the connection portion 17 or the connection piece 535, 537, 539, or 541 can be prevented.

Figure 21:
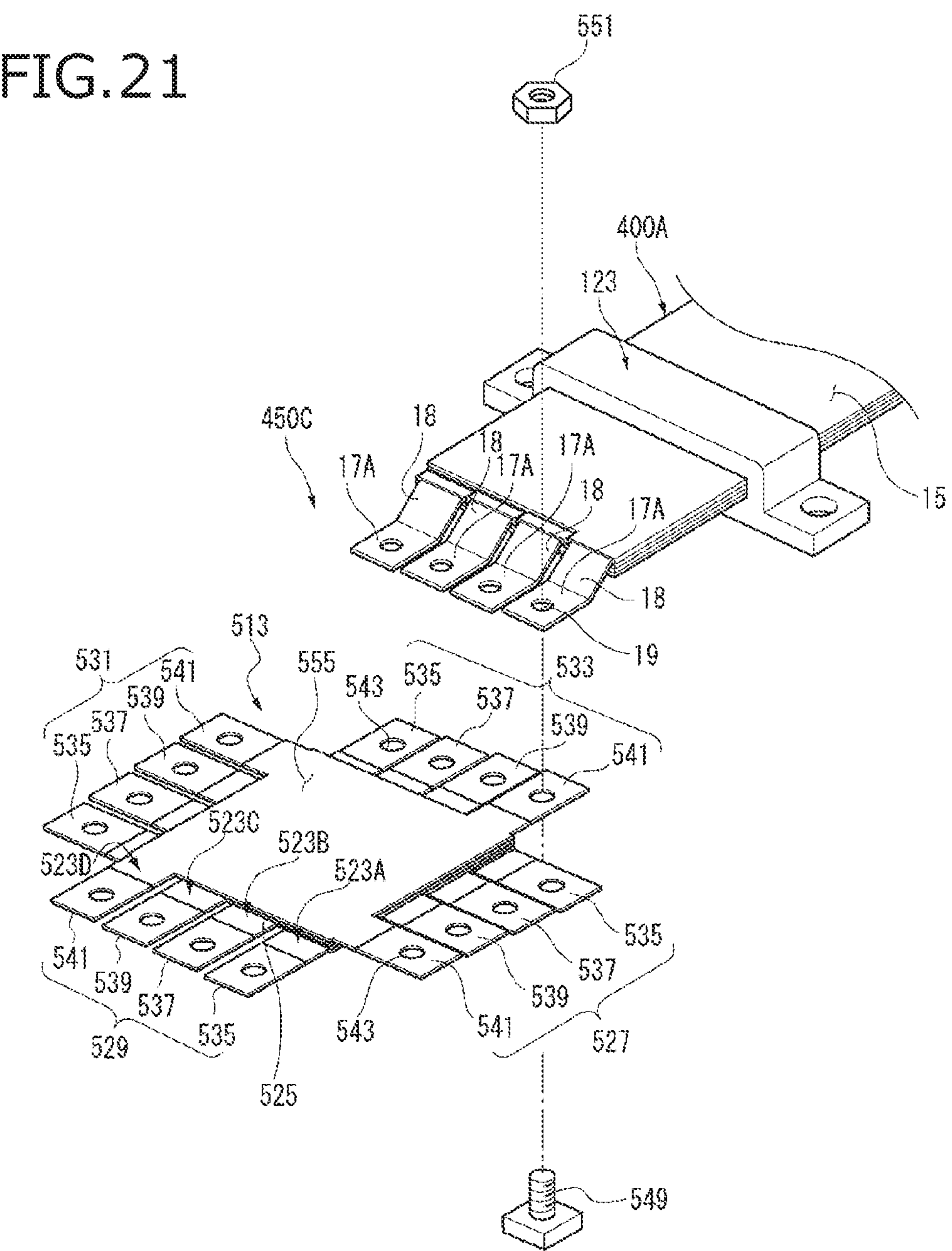
FIG. 21 is a perspective view of a vehicular wiring member having connection portions that are different in structure from the connection portions of the vehicular wiring member shown in FIG. 19 and the branching connection member and illustrates a wiring member connection structure according to a seventh embodiment of the invention.
Figure 22:
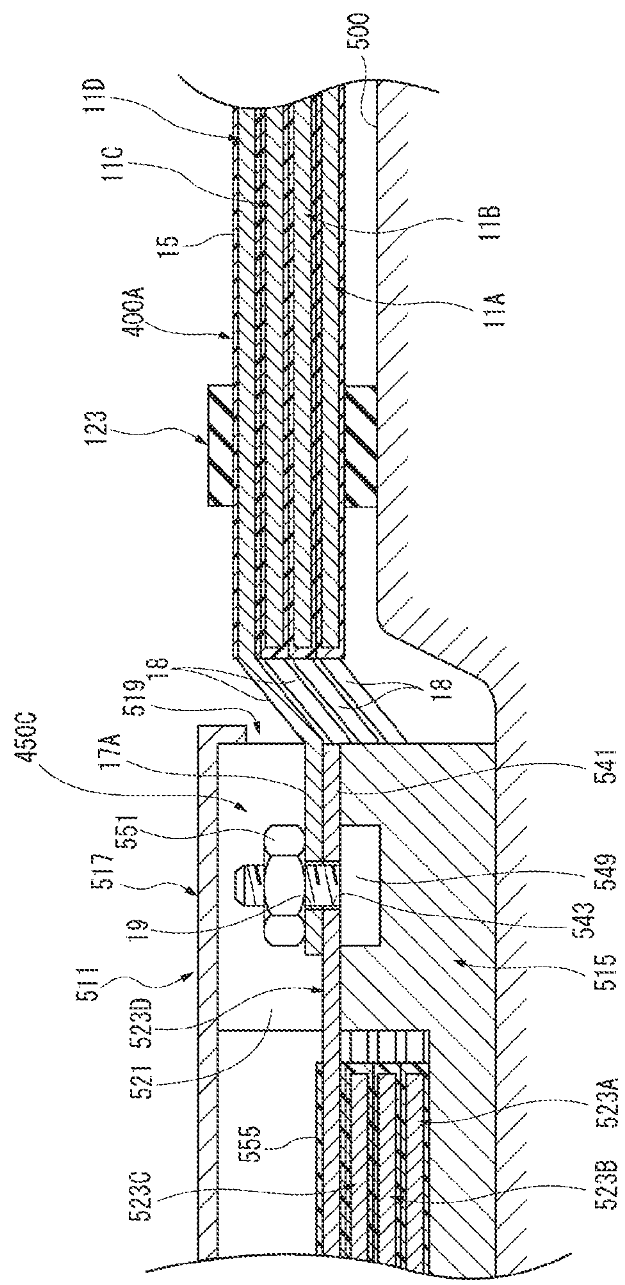
FIG. 22 is a sectional view of an essential part including a connection portion of connection portions and connection pieces shown in FIG. 21.

FIG. 21 is a perspective view of a vehicular wiring member 400A having connection portions 17A that are different in structure from the connection portions 17 of the vehicular wiring member 400 shown in FIG. 19 and the branching connection member 513 and illustrates a wiring member connection structure according to a seventh embodiment of the invention. FIG. 22 is a sectional view of an essential part including a connection portion 450C of the connection portions 17A and the first to fourth connection pieces 535, 537, 539, and 541 shown in FIG. 21.

As shown in FIG. 21, the connection portions 17A of the flat conductors 11A-11D, bundled by a clamp 123, of the vehicular wiring member 400A are formed with bent portions 18 for absorbing gaps that are formed due to height differences with respect to installation locations of the first to fourth connection pieces 535, 537, 539, and 541.

More specifically, as shown in FIG. 22, where there exists a height difference between the installation locations of the vehicular wiring member 400A and the branching box 511 housing the branching connection member 513 (the laminate of the flat plates 523A-523D) which are installed on the attachment surface 500, the connection portions 17A are formed in advance with respective crank-shaped bent portions 18 that are suitable for gaps that are produced by the height difference so that the connection portions 17A absorb the gaps and come into surface contact with the first to fourth connection pieces 535, 537, 539, and 541.

Formed with the respective bent portions 18, the connection portions 17A absorb the gaps with respect to the first to fourth connection pieces 535, 537, 539, and 541 and can thereby secure necessary contact areas. Furthermore, a bending load is not prone to be produced in the thickness direction at each position where a connection portion 17A is fixed to the corresponding one of the first to fourth connection pieces 535, 537, 539, and 541, whereby deformation or damaging of the connection portion 17 or the corresponding one of the first to fourth connection pieces 535, 537, 539, and 541 can be prevented.

Since each connection portion 17 is formed with a crank-shaped bent portion 18, the connection portion 17 allows escape of stress in the direction in which the vehicular wiring member 400A extends straightly and can thereby prevent damaging of the connection portion 17A.

The bent portion 18 may be formed in each of the first to fourth connection pieces 535, 537, 539, and 541 instead of each connection portion 17A. As a further alternative, the bent portion 18 may be formed in both of each connection portion 17A and each of the first to fourth connection pieces 535, 537, 539, and 541. The connection portions 17A of the flat conductors 11A-11D may be connected to the first to fourth connection pieces 535, 537, 539, and 541 by welding or soldering.

The features of the wiring members, the manufacturing methods of a wiring member, and the wiring member connection structures according to the embodiments of the invention will be summarized below concisely in the form of items [1]-[10]:

[1] A wiring member (vehicular wiring member 100, 200, 300, 400) including:

a laminated flat conductor that includes;

a plurality of flat conductors (11A-11D) laid on each other in a thickness direction of the laminated flat conductor; and insulating sheet members (13) each of which is interposed between and electrically insulate adjacent ones of the plurality of flat conductors (11A-11D); and an insulating layer (15) provided around the laminated flat conductor.

[2] The wiring member according to item [1], further including:

a shield layer (16) that surrounds the plurality of flat conductors (11A-11D).

[3] A manufacturing method of a wiring member (vehicular wiring member 100, 200, 300, 400) including:

an insulation step of inserting an insulating sheet member (13) between adjacent ones of a plurality of flat conductors (11A-11D) to insulate the plurality of flat conductors electrically from each other;

a lamination step of laminating the plurality of flat conductors (11A-11D) with the insulating sheet in the thickness direction of a laminated flat conductor to form the laminated flat conductor; and an insulating layer forming step of forming an insulating layer (15) around the laminated flat conductor.

[4] The manufacturing method of a wiring member (vehicular wiring member 300, 400) according to item [3], further including:

a bending step of bending the laminated flat conductor into a prescribed shape before forming the insulating layer (15).

[5] The manufacturing method of a wiring member (vehicular wiring member 200) according to item [3] or [4], further including a shield layer forming step of forming a shield layer (16) around the plurality of flat conductors (11A-11D).

[6] A wiring member connection structure including spacers (420) that are interposed between two sets of connection portions (17), to be connected electrically to each other, of two sets of flat conductors (11A-11D) of two wiring members (first wiring member 410 and second wiring member 430) according to item [1] or [2] and serve to absorb gaps that are produced due to installation height differences between the two sets of connection portions (17).

[7] A wiring member connection structure including bent portions (18) that are provided in at least one of two sets of connection portions (17), to be connected electrically to each other, of two sets of flat conductors (11A-11D) of two wiring members (first wiring member 410A and second wiring member 430) according to item [1] or [2] and serve to absorb gaps that are produced due to installation height differences between the two sets of connection portions (17).

[8] A wiring member connection structure including spacers (420) that are interposed between the connection portions (17) of the flat conductors (11A-11D) of the wiring member (vehicular wiring member 400) according to item [1] or [2] and connection pieces (first to fourth connection pieces 535, 537, 539, and 541) of a branching connection member (513) to be connected electrically to the respective connection portions (17) and serve to absorb gaps that are produced due to an installation height difference between the wiring member (400) and the branching connection member (513).

[9] A wiring member connection structure including bent portions (18) that are provided in at least one of the set of connection portions (17) of the flat conductors (11A-11D) of the wiring member (vehicular wiring member 400A) according to item [1] or [2] and a set of connection pieces (first to fourth connection pieces 535, 537, 539, and 541) of a branching connection member (513) to be connected electrically to the respective connection portions (17) and serve to absorb gaps that are produced due to an installation height difference between the wiring member (400A) and the branching connection member (513).

[10] The wiring member connection structure according to item [8] or [9], characterized in that the branching connection member (513) is housed in an insulative branching box (511).

What is claimed is:

1. A wiring member comprising:

a laminated flat conductor that comprises;

a plurality of flat conductors laid on each other in a thickness direction of the laminated flat conductor, wherein the plurality of flat conductors includes at least four flat conductors; and insulating sheet members, each of which is interposed between, adjoins, and electrically insulates adjacent ones of the plurality of flat conductors such that a different one of the insulating sheet members is interposed between and adjoins each adjacent pair of flat conductors;

an insulating layer provided around the laminated flat conductor;

a shield layer that surrounds the plurality of flat conductors; and another insulating layer that surrounds an outer surface of the shield layer, wherein each of the flat conductors has a main body and a connection portion, and the connection portion protrudes from the insulating sheet member in an extending direction of the laminated flat conductor beyond an edge of the main body of each of the flat conductors so as to be exposed outside, wherein widths of the connection portion of the flat conductors are same as each other in a width direction which is perpendicular to both of the thickness direction and the extending direction, wherein the main body of each of the flat conductors is greater in width than the connection portion of each of the flat conductors in the width direction, and wherein the connection portions of the flat conductors are shifted in the width direction so as not to overlap each other in a view from the thickness direction.

2. A wiring member connection structure comprising:

spacers that are interposed between two sets of connection portions, to be connected electrically to each other, of two sets of flat conductors of two wiring members according to claim 1, wherein the spacers serve to absorb gaps that are produced due to installation height differences between the two sets of connection portions.

3. A wiring member connection structure comprising:

bent portions that are provided in at least one of two sets of connection portions, which are to be connected electrically to each other, of two sets of flat conductors of two wiring members according to claim 1, and wherein the bent portions are configured to absorb gaps that are produced due to installation height differences between the two sets of connection portions.

4. A wiring member connection structure comprising:

a wiring member comprising:

a laminated flat conductor that comprises:

a plurality of flat conductors laid on each other in a thickness direction of the laminated flat conductor, wherein the plurality of flat conductors includes at least four flat conductors; and insulating sheet members, each of which interposed between, adjoining, and electrically insulating adjacent ones of the plurality of flat conductors such that a different one of the insulating sheet members is interposed between and adjoins each adjacent pair of flat conductors; and an insulating layer provided around the laminated flat conductor; and spacers that are interposed between connection portions of the plurality of flat conductors of the wiring member and connection pieces of a branching connection member to be connected electrically to respective ones of the connection portions, wherein the spacers are configured to absorb gaps that are produced due to an installation height difference between the wiring member and the branching connection member.

5. A wiring member connection structure comprising:

bent portions that are provided in at least one set of connection portions of a plurality of flat conductors of a wiring member, wherein the wiring member comprises:

a laminated flat conductor that comprises:

the plurality of flat conductors laid on each other in a thickness direction of the laminated flat conductor, wherein the plurality of flat conductors includes at least four flat conductors; and insulating sheet members, each of which is interposed between, adjoins, and electrically insulates adjacent ones of the plurality of flat conductors such that a different one of the insulating sheet members is interposed between and adjoins each adjacent pair of flat conductors;

an insulating layer provided around the laminated flat conductor;

a shield layer that surrounds the plurality of flat conductors; and another insulating layer that surrounds an outer surface of the shield layer, and a set of connection pieces of a branching connection member to be connected electrically to respective connection portions of the at least one set of connection portions, wherein the bent portions are configured to absorb gaps that are produced due to an installation height difference between the wiring member and the branching connection member.

6. The wiring member connection structure according to claim 4, wherein the branching connection member is housed in an insulative branching box.

7. The wiring member connection structure according to claim 5, wherein the branching connection member is housed in an insulative branching box.

8. The wiring member connection structure according to claim 2, wherein each wiring member further comprises:

a shield layer that surrounds the plurality of flat conductors.

9. The wiring member connection structure according to claim 4, wherein the wiring member further comprises:

a shield layer that surrounds the plurality of flat conductors.

* * * * *